United States Patent [19]

Sawada et al.

[11] Patent Number: 4,725,720
[45] Date of Patent: Feb. 16, 1988

[54] MICROSCOPE WITH AUTO FOCUS AND LIGHT ADJUSTING MEANS

[75] Inventors: Katsuhide Sawada; Hirohiko Shinonaga, both of Kawasaki; Tadashi Satoh, Yokohama, all of Japan

[73] Assignee: Mitutoyo Manufacturing Co., Ltd., Japan

[21] Appl. No.: 867,143

[22] Filed: May 27, 1986

[30] Foreign Application Priority Data

May 27, 1985 [JP] Japan ................. 60-113535
May 27, 1985 [JP] Japan ................. 60-113536

[51] Int. Cl.⁴ .............................................. G01J 1/20
[52] U.S. Cl. ............................... 250/201; 250/205
[58] Field of Search ............ 250/201 AF, 205; 356/4, 356/1; 354/403; 350/507, 514, 519, 523, 532

[56] References Cited

U.S. PATENT DOCUMENTS

| | | | |
|---|---|---|---|
| 4,447,717 | 5/1984 | Nohda | 250/201 AF |
| 4,555,620 | 11/1985 | Bridson et al. | 250/205 |
| 4,609,814 | 9/1986 | Nobuaki et al. | 250/201 AF |
| 4,639,587 | 1/1987 | Chadwick et al. | 250/201 AF |

Primary Examiner—David C. Nelms
Assistant Examiner—Chung K. Seo
Attorney, Agent, or Firm—Parkhurst & Oliff

[57] ABSTRACT

A microscope comprises:
a mount for mounting an object, a light source for illuminating the object, an enlarging optical system including a plurality of objectives provided on a revolver, and means for receiving light from the object to enlargingly form an image of the object. An observing optical system includes an ocular lens for observing said image. The microscope further comprises a magnification selecting unit including a driving mechanism for rotating the revolver, and a magnification selection control circuit for automatically positioning said selected objective to the optical axis of the enlarging optical system. An automatic focus adjusting unit includes a focus detector opposed to the observing optical system for discriminating the enlargedly formed image, and a mount moving device for driving the mount to the position of focus in response to an output signal from the focus detector. A light quantity adjusting unit adjusts the quantity of emitted light from the light source on the basis of a preset light quantity value. A control table automatically actuates the magnification selecting unit, the automatic focus adjusting unit and the light quantity adjusting unit in accordance with predetermined steps in response to a magnification selection signal.

21 Claims, 8 Drawing Figures

MICROSCOPE WITH AUTO FOCUS AND LIGHT ADJUSTING MEANS

BACKGROUND OF THE INVENTION

1. Field of the Invention

This invention relates to a microscope, and more particularly to a microscope, wherein selection of magnification, focusing and the like are automatically performed.

2. Description of the Prior Art

The well-known microscopes have heretofore required fine adjusting operation and skills for observing objects to be observed in sharp image formation. For this reason, it has been difficult to observe the objects rapidly and in large quantities during the industrial production processes, and necessity has been voiced for a microscope, wherein the process from the selection of magnification to the focusing is automatically performed.

Here, when the adjusting operation of the microscope is to be automated, particularly, the focusing is to be automated, such a problem is presented that, unless the automatic focusing mechanism is rendered compact in size and light in weight, it is not the microscope.

For example, when a DC servo mechanism is adopted for a mount where the object to be observed is rested, the servo mechanism is large-sized and needs a braking device to hold a static position, so that the requirements for compactness and light weight cannot be satisfied.

Furthermore, when such a construction is adopted that the mount is driven by a stepping motor, in order to effect highly accurate positioning, the stepping motor should be connected to a driving shaft of the mount through a reduction gear. Then, such disadvantages are presented that backlash occurs as the microscope is increased in its size and heat during the operation is notably raised to secure a retarding torque.

Furthermore, the reduction ratio of the reduction gear should be set at 1/70 or more, and it is difficult to obtain the reduction ratio of this kind.

Additonally, it is possible to complete the automatic focusing adjustment of an objective for a few seconds by use of the conventional well-known means. However, it takes much time for rotation of a revolver selection the objective as the pre-operation, and, in addition to it, if a confirmation work for collating the relationship between the objective and the magnification is performed, then the additional working time period of 30 sec or more is needed.

For this reason, the validity of the automatic focusing device is diminished.

Moreover, when the automatic focusing adjustment of the objective is performed, the moving time and accuracy of the mount to the focusing position of the objective raise problems.

More specifically, in order to lesson the time for setting the microscope, it is desirable to move the mount at high speed. However, when the mount is moved at high speed, it is difficult to bring the mount into a static state at the optimal position, whereby hunting and the like tend to occur and, in general, with the microscope, the moving stroke of the mount is relatively small, thus presenting an additional problem.

On the other hand, when the mount is moved at slow speed, it becomes difficult to set the microscope quickly.

Furthermore, in performing the automatic focus adjustment of the objective, the lightness of the object to be observed should be at a predetermined level or more, and this lightness differs depending on the magnification of the objectives, and, unless the lightness of the object to be observed can be automatically adjusted, the validity of the automatic focus adjusting mechanism is diminished.

SUMMARY OF THE INVENTION

An object of the present invention is to provide a microscope, wherein the magnification setting of the objective, the focus adjustment of the mount for the selected objective and the setting of lightness of the object to be observed can be automatically and quickly performed.

Another object of the present invention is to provide a microscope wherein, when the microscope is automatically adjusted in its focusing, selection and setting of an objective are carried out for a short period of time and the quick setting can be attained.

A further object of the present invention is to provide a microscope, wherein, when the microscope is automatically adjusted in its focusing, a device for moving the mount is rendered light in weight and compact in size, and the mount can be moved with hight accuracy and for a short period of time to perform the focusing.

A still further object of the present invention is to provide a microscope, wherein the lightness of the object to be observed is automatically changed over to the optimal degree in accordance with the selection and setting of the magnification of the objective.

To achieve the above-described object, the present invention contemplates that, in a microscope comprising:

a mount for mounting an object to be observed;

a light source for illuminating the object to be observed;

an enlarging optical system including a plurality of objectives provided on a revolver, and receiving at least one of reflected light and transmitted light from the object to be observed to enlargingly form an image of the object to be observed; and an observing optical system including an ocular lens and observing the image formed by the enlarging optical system; the microscope further comprises:

a magnification selecting unit including a driving mechanism for rotating the revolver, and a magnification selection control circuit for automatically positioning the selected objective to optical axis of the enlarging optical system;

an automatic focus adjusting unit including a focus detector opposed to the observing optical system, for discriminating the enlargedly formed image of the object to be observed, and a mount moving device for driving the mount to the position of focus of the selected objective along the optical axis of the objective by means of a driving mechanism in response to an output signal from this focus detector;

a light quantity adjusting unit for adjusting the quantity of emitted light from the light source on the basis of a present light quantity value; and a control table for automatically actuating the magnification selecting unit, the automatic focus adjusting unit and the light quantity adjusting unit is accordance with predetermined steps in response to a magnification selection signal inputted and instructed prior to the observation.

Furthermore, to achieve the above-described objects, the present invention contemplated that a driving mechanism of the mount moving device includes:

a stepping motor directly connected to the mount; and an excitation change-over device for gradually changing the magnitudes of currents of respective phases of a plurality of excitation phases for finely dividing a step angle by gradually moving the position of a stabilized point of a static torque curve of stepping motor by a very small angle per input pulse.

Additionally, to achieve the above-described objects, the present invention contemplates that the stepping motor has a four phase basic construction of 1-2 phase excitation, and, in the excitation change-over device, the exciting current is gradually changed over so that the first phase and the second phase have loci of substantially sine wave form, wherein the former and the latter are shifted from each other in phase by 90°.

To the above end, the present invention contemplates that the mount moving device further comprises; a high speed drive command device capable of outputting pulse signals for high speed feed to said stepping motor to feed said driving shaft at high speed; a preset value drive command device for outputting a predetermined number of pulse signals fewer than said pulse signals for the high speed feed, as a unit, to said stepping motor on the basis of the focal depth of said set objective; a control circuit for switchingly connecting said stepping motor from said high speed drive command device to the present value drive command device when it is detected that said mount approaches the range of the focal depth of said set objective from a detection output signal of said focus detector, for collating the value of the approach with an output signal of said focus detector per unit pulse drive, and for repeatedly actuating said preset value drive command device until said mount enters the range of the focal depth of the set objective.

To achieve the above-described object, the present invention comtemplates that the magnification selecting unit includes:

a plurality of position sensors secured onto the stationary side of the revolver, corresponding in number to the plurality of objectives provided on the revolver;

two members to be detected secured onto the rotatable side of the revolver and capable of being simultaneously detected by two of the plurality of position sensors; and a rotating direction specifying circuit for identifying the current objective in response to an output signal from the position sensors and specifying the shortest rotating direction to the objective having the instructed magnification.

To the above end, the present invention contemplates that the control table includes an automatic observation setting device making it possible to fully automatically select and set the position of the mount in the X-Y directions and the enlarging magnification of the objective.

To achieve the above-described objects, the present invention contemplates that, in a mount moving device for a microscope including:

a plurality of objectives which can be selectively set to an observing optical system of the microscope;

a moving mechanism for moving a mount along the optical axis of the objective set on the observing optical system; and a focus detector for detecting the pass-fail of the focus of the set objective from the observing optical system; the mount moving device further includes:

a stepping motor directly connected to a driving shaft of a lifting mechanism and formed to become a stabilized point per predetermined step angle;

an excitation change-over device for gradually changing the magnitudes of currents of respective phases of a plurality of excitiation phases for finely dividing the step angle associated thereto by gradually moving the position of the stabilized point of a static torque curve of the stepping motor by a very small angle per input pulse;

a high speed drive command device capable of outputting pulse signals for high speed feed to the stepping motor to feed the driving shaft at high speed;

a preset value drive command device for outputting a predetermined number of pulse signals fewer than the pulse signals for the high speed feed, as a unit, to the stepping motor on the basis of the focal depth of the set objective; and a control circuit for switchingly connecting the stepping motor from the high speed drive command device to the preset value drive command device when it is detected that the mount approaches the range of the focal depth of the set objective from a detection output signal of the focus detector, for collating the value of the approach with an output signal of the focus detector per unit pulse drive, and for repeatedly actuating the preset value drive command device until the mount enters the range of the local depth of the set objective.

According to the present invention, after a command of selecting one of the plurality of objectives is given, setting of the selected objective to the optical axis, setting of the mount to the position of focus of the objective and setting to the adjustment associated with the magnification of the selected objective can be automatically, quickly and accurately performed.

According to the present invention, the mount moving device for moving the mount to the position of focus of the objective driven by the stepping motor for directly driving the device at finely divided step angles, thus enabling to make focusing accurately and quickly.

According to the present invention, in the stepping motor, the exciting current thereof is gradually changed over so that the first phase and the second phase of the stepping motor can have the loci of sine wave form, wherein the former and the latter are shifted from each other in phase by 90°, thus enabling to obtain highly accurate step rotations.

According to the present invention, in the magnification selecting unit, when a command signal for selecting an objective is inputted, the revolver can be rotated in the shortest rotating direction when the selected objective is set, thus reducing the time period for selecting and setting the objective.

According to the present invention, the mount moving device for moving the mount to the position of focus of the objective can be directly driven by the stepping motor for directly driving the device at the finely divided step angles, and moved at high speed to the proximity of the focal depth of the objective and moved at a slow preset value feed into the range of the focal depth, thus enabling to make focusing accurately and quickly without any overstroke.

DETAILED DESCRIPTION OF THE PREFERRED EMBODIMENT

Description will hereunder be given of one embodiment of the present invention with reference to the drawings.

Figure 1:
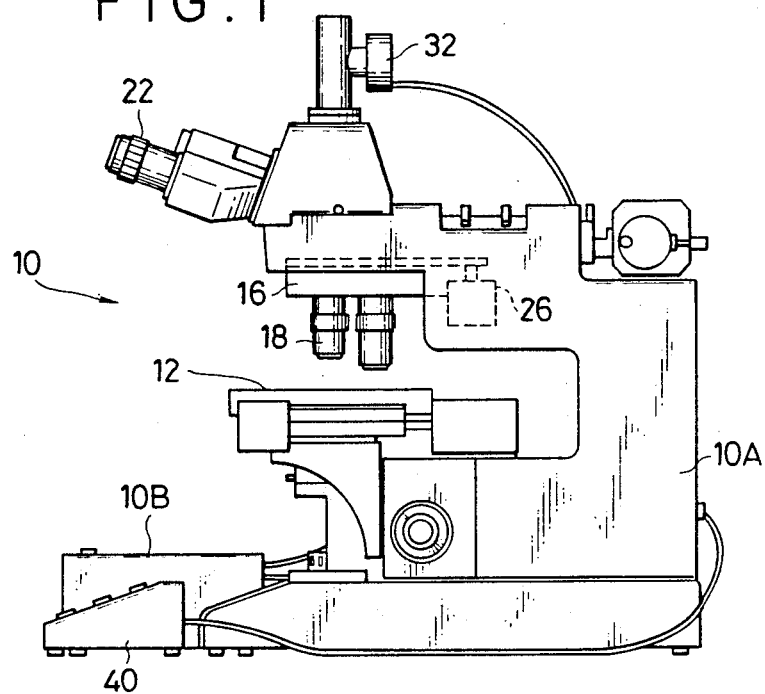
FIG. 1 is a side view showing one embodiment of the microscope according to the present invention.
Figure 2:
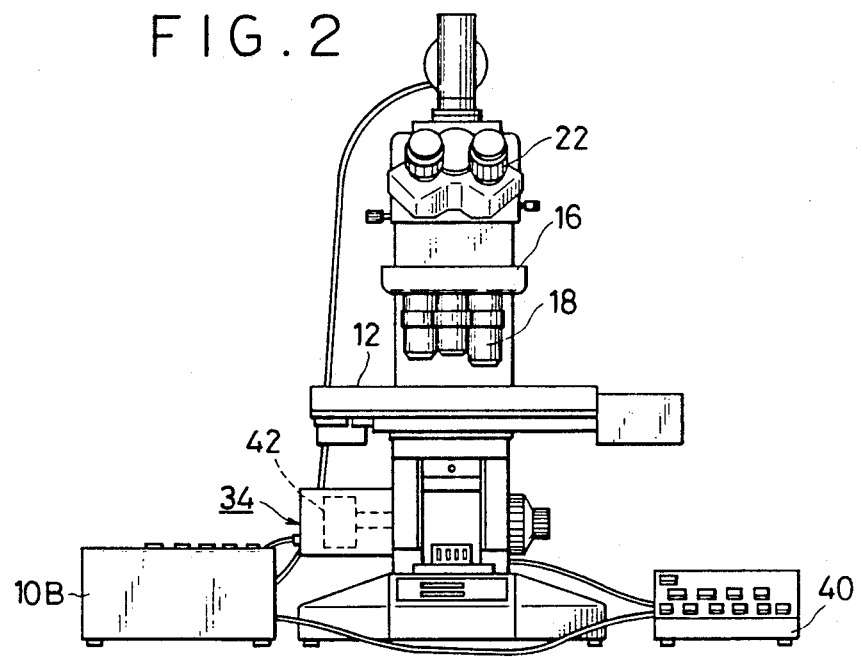
FIG. 2 is a front view thereof.
Figure 3:
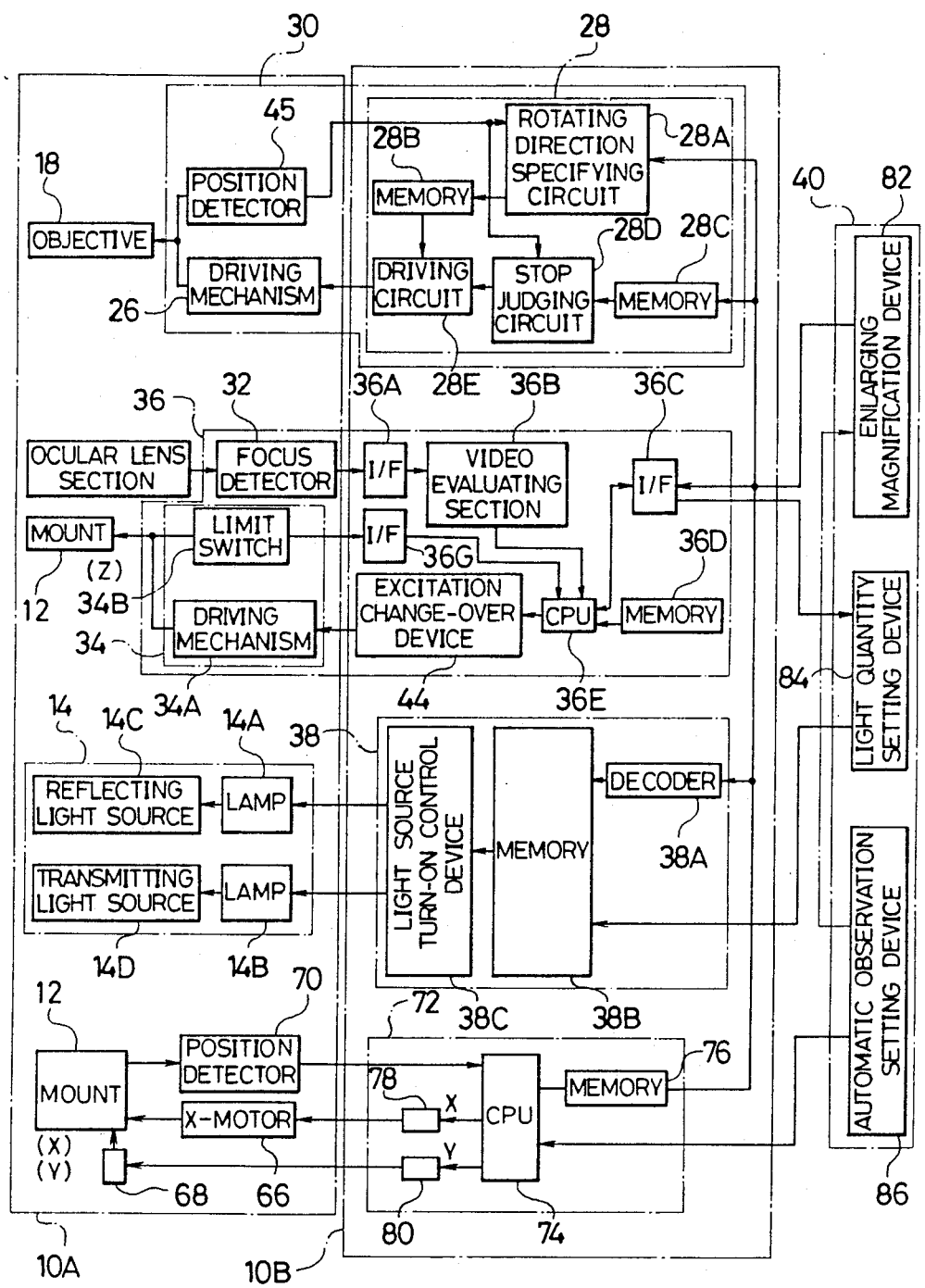
FIG. 3 is a block diagram showing the control circuit in the above embodiment.

As shown in FIGS. 1 to 3, in a microscope 10 comprising:

a mount 12 for mounting an object to be observed, not shown;

a light source 14 for illuminating the object 12 to be observed;

an enlarging optical system including a plurality of objectives 18 provided on a revolver 16, and receiving at least one of reflected light and transmitted light from the object 12 to be observed to enlargingly form an image of the object 12 to be observed; and an observing optical system including an ocular lens 22 and observing the image formed by the enlarging optical system;

the microscope 10 further comprises:

a magnification selecting unit 30 including a driving mechanism 26 for rotating the revolver 16, a magnification selection control circuit 28 for automatically positioning the selected objective 18 to the optical axis of the enlarging optical system;

an automatic focus adjusting unit 36 including a focus detector 32 opposed to the observing optical system, for discriminating the enlargedly formed image of the object 12 to be observed, and a mount moving device 34 for driving the mount to the position of focus of the selected objective 12 along the optical axis of the objective 12 by means of a driving mechanism 34A in response to an output signal from the focus detector 32;

a light quantity adjusting unit 38 for adjusting the quantity of emitted light from the light source 14 on the basis of the preset light quantity value; and a control table 40 for automatically actuating the magnification selecting unit 30, the automatic focus adjusting unit 36 and the light quantity adjusting unit 38 in accordance with predetermined steps in response to a magnification selection signal inputted and instructed prior to the observation.

A driving mechanism 34A of the mount moving device 34 includes:

a stepping motor 42 directly connected to the mount 12;

an excitation change-over device 44 for gradually changing the magnitude of current of the respective phases of a plurality of excitation phase for finely dividing the step angle by gradually moving the position of the stabilized point of a static torque curve of the stepping motor 42 by a very small angle per input pulse.

The stepping motor 42 has a four phase basic construction of 1-2 phase excitation, and, in the excitation change-over device 44, the exciting current is gradually changed over so that the first phase and the second phase have loci of substantially sine wave form, wherein the former and the latter are shifted from each other in phase by 90°.

Figure 4:
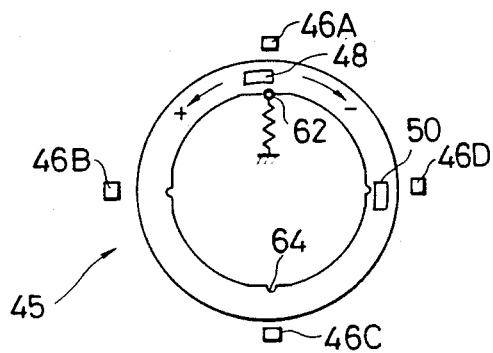
FIG. 4 is a plan view showing the position detector in the above embodiment.

As shown in FIG. 4, the magnification selecting unit 30 includes:

a plurality of position sensors 46A–46D secured onto the stationary side of the revolver 16, corresponding in number to the plurality of objectives 18 provided on the revolver 16;

two members 48 and 50 to be detected which are secured onto the rotatable side of the revolver 16 and capable of being simultaneously detected by two of the plurality of position sensors 46A–46D; and a rotating direction specifying circuit 28A (Refer to FIG. 3) for identifying the current objective 18 in response to an output signal from the position sensors 46A–46D and specifying the shortest rotating direction to the objective 18 having the instructed magnification.

In FIG. 4, designated at 62 is a click mechanism and 64 are recesses provided on the revolver 16, corresponding in number to the objectives 18 and opposed thereto, for being engaged with the click mechanism 62.

The two members 48 and 50 to be detected of a position detector 45 in the magnification selecting unit 30 are magnets and the position sensors 46A–46D are Hall IC.

The members 48 and 50 to be detected as being the magnets are shifted from the interval of mounting of the position sensors 46A–46D and the two position sensors can detect the both members 48 and 50 in the state where the click mechanism 62 are fallen into the recess 64.

Figure 5:
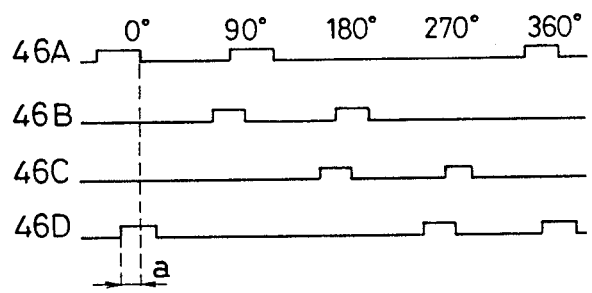
FIG. 5 is a chart showing the relationship between the output signals from the position sensor of the position detector and the angles of rotation of the revolver.

As shown in FIG. 5, discrimination of the position of the objective 18 by the position detector 45 is carried out in such a manner that the members 48 and 50 are detected by two of the position sensors 46A–46D.

In other words, the two position sensors detect the members 48 and 50, so that the current position can be known by a logical product thereof.

The magnification selection control circuit 28 comprises:

a rotating direction specifying circuit 28A, when an output signal from the position detector 45 and a magnification selection command signal from an enlarging magnification device 82 provided on the control table 40 are inputted thereto, outputting a signal for the rotating direction shortest from the current position of the revolver 16 to the position of the objective 18 specified by the enlarging magnification setting device 82 in response to the two signals;

a memory 28B for storing the output signals from the rotating direction specifying circuit 28A;

a memory 28C for storing the selection-setting signals from the enlarging magnification setting device 82;

a stop judging circuit 28D for comparing an output signal from the memory 28C and an output signal from the position detector 45 and outputting a stop signal when the both signals coincide with each other; and a driving circuit 28E for driving the driving mechanism 26 in response to an output signal from the memory 28B and stopping the driving mechanism 26 when a stop signal from the stop judging circuit 28D is inputted thereto.

Here, the driving mechanism 26 in the magnification selecting unit 30, the position detector 45, the focus detector 32 in the automatic focus adjusting unit 36, the mount moving device 34 and the light source 14 are provided on the side of the microscope body 10A.

Furthermore, portions other than the portions in the magnification selecting unit 30 and the automatic focus adjusting unit 36, which are provided on the microscope body 10A, and the light quantity adjusting device 38 are provided on a control box 10B formed separately of the microscope body 10A.

The microscope body 10A is further provided thereon with an X-direction motor 66 and a Y-direction motor 68 for driving the mount 12 in the directions of X-axis and Y-axis, respectively, and a position detector 70 for detecting the position of the mount 12 in the X- and Y-directions, respectively.

Furthermore, the control box 10B is provided thereon with An X-Y driving device 72 for the mount 12 in addition to the above.

This X-Y driving device 72 has a central processing unit 74, a memory 76, and an X-direction driving circuit 78 and a Y-direction driving circuit 80 for drivably controlling the X-direction motor 66 and the Y-direction motor 68, respectively.

Figure 6:
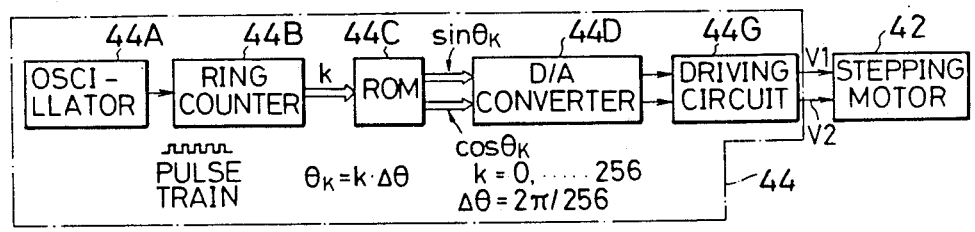
FIG. 6 is a block diagram showing the driving mechanism of the mount moving device in the above embodiment.

As described above, the driving mechanism 34A in the automatic focus adjusting unit 36 includes the stepping motor 42 and the excitation change-over device 44. As shown in FIG. 6, this excitation change-over device 44 includes: an oscillator 44A for producing pulse signals; a ring counter 44B for forming 8 bit data to count a pulse train outputted from the oscillator 44A and return to zero at the count number 256; ROM 44C for outputting values of sine and cosine, which are associated with output signals from this ring counter 44B; and a D/A converter 44D for outputting an output signal from the ROM 44C to a driving circuit 44G as an excitation signal after the D/A conversion.

Furthermore, the automatic focus adjusting unit 36 includes: a video signal evaluating section 36B for receiving a focus detection signal from the focus detector 32 through an interface 36A and detecting what extent the input signal is shifted from the position of focus, i.e. the sharpness of the image of the object to be observed; and a central processing unit 36A for receiving an output signal from the video signal evaluating secion 36B, a setting command signal from the enlarging magnification setting device 82 in the control table 40 through an interface 36C and a signal from a memory 36D, and driving the excitation change-over device 44.

Here, limit switches 34B are provided at the upper and the lower limits of the mount 12 in the mount moving device 34, a signal is outputted by the mount 12 at the upper or the lower limit position thereof, and the signal is inputted to the central processing unit 36E through an interface 36G.

Figure 7:
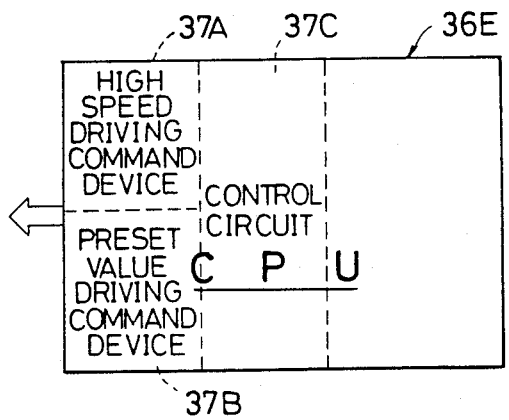
FIG. 7 is a block diagram showing a central processing unit in the automatic focus adjusting unit in the above embodiment.

As shown in FIG. 7, the central processing unit 36E includes:

a high speed drive command device 37A capable of high speed feeding the stepping motor 42 by outputting pulse signals for high speed feed from the oscillator in the excitation change-over device 44 for the stepping motor 42;

a preset value drive command device 37B for outputting signals so as to output a predetermined number of pulse signals fewer than the pusle signals for high speed feed, as a unit, in accordance with the focal depth of the objective 18 selected by the enlarging magnification setting device 32; and a control circuit 37C for changing the high speed drive command device 37A over to the preset value drive command device 37B when it is detected by the video signal evaluation section 36B from a detection output signal from the focus detector 32 that the mount 12 approaches the range of focal depth of the selected objective 18, comparing a signal inputted from the focus detector 32 per unit pulse drive through the video signal evaluating section 36B with the focal depth of the selected objective 18 which is previously stored by the memory 36D, and repeatedly actuating the preset value drive command device 37B until the signal from the video signal evaluating section 36B comes into the range of the focal length.

Here, similarly to the ordinary stepping motor, the stepping motor 42 in the drive mechanism 34A is of 1-2 phase excitation, wherein rotation of 0.9° is made per one pulse and 8 pulses at one cycle, i.e. 7.2° are adopted. While, in the excitation change-over device 44, the aforesaid 7.2° is divided into 256, whereby gradual excitation is performed such that 0.028° proceeds per pulse.

In consequence, when the pitch of a driving shaft of the mount moving device 34 is set at 2.4 mm, the value of movement of the mount 12 is 2.4×0.02°/360°=0.19 μm per pulse.

Figure 8:
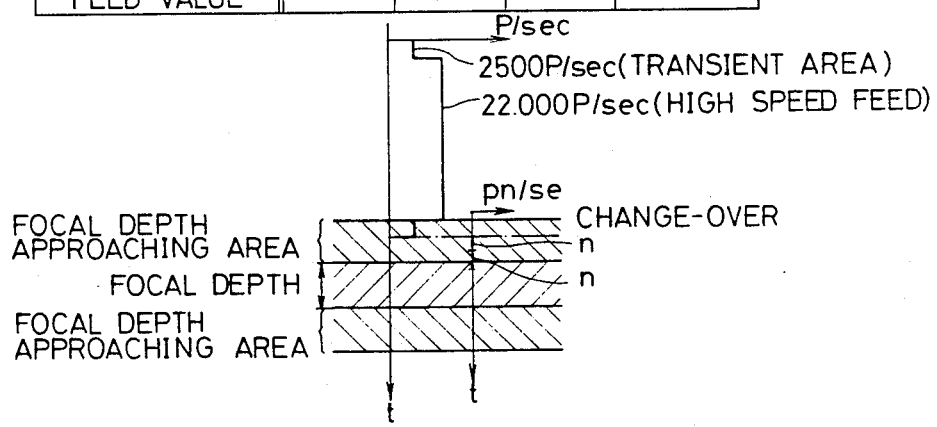
FIG. 8 is a chart showing the process of controlling the mount moving device by the central processing unit of the automatic focus adjusting unit in the above embodiment.

Here, the number of pulses per unit oscillated by the osoillator 44A of the excitation change-over device 44 in response to the signals outputted from the high speed drive command device 37A and the preset value drive command device 37B is shown in FIG. 8 as obtained on the basis of the focal depth associated with the magnification of the objective 18 previously stored in the memory 36D.

More specifically, when the focal depth of the selected objective 18 is deep, the number of pulse signals per unit, which are outputted in response to a command signal from the preset value drive command device 37B is large, while, the focal depth is shallow, the number is small.

Furthermore, the pulse signals for high speed feed in response to the signal from the high speed command device 37A is determined to be 22000P/sec, i.e. the moving distance of the mount 12 per sec being 4.18 mm/sec.

As shown in FIG. 8, the relationship between the focal depth and the unit pulse number is determined such that the feed value of the mount 12 by a unit pulse number n is smaller than the focal depth of the selected objective 18.

Here, the unit pulse number associated with the focal depth and the unit pulse number associated with the high speed feed can be adjusted to be increased or decreased.

Furthermore, the control circuit 37C outputs command signals of transient speed of 2500P/sec to the excitation change-over device 44 during the time period from the rising to the high speed drive and at the time of completion of the high speed drive and change-over to the preset value drive.

The light quantity adjusting device 38 includes:

a memory 38B for storing command signals from a light quantity setting device 84 in the control table 40 and storing the setting command signals from the enlarging magnification setting device 82 inputted through a decoder 38A; and a light source turn-on control device 38C for controlling turn-on of the light source 14 in response to an output signal from this memory 38B.

Furthermore, the light source 14 includes:
lamps 14A and 14B;

a reflecting light source 14C for illuminating the object to be observed, which is on the mount 12, from above by the light emitted from the lamp 14A; and a transmitting light source 14D for illuminating the object to be observed, which is on the mount 12, from below by the light emitted from the lamp 14B.

The memory 38B is of such an arrangement that the light quantities of the lamps 14A and 14B, which are associated with the respective magnifications of the objective 18, are previously stored, storages of the light quantitites can be changed in response to a command signal from the light quantity setting device 84 provided on the control table 40, and a light quantity signal associated with the magnification of the selected objective 18 is outputted to the light source turn-on control device 38C in response to a selection-setting signal from the enlarging magnification setting device 82, which is inputted through the decoder 38A.

The light source turn-on control device 38C controls the light quantities of the lamps 14A and 14B in response to signals from the memory 38B.

Here, change-over from the lamp 14A to the lamp 14B and vice versa, i.e. change-over from the reflecting illumination to the transmitting illumination and vice versa is manually performed from the outside.

Description will hereunder be given of action of the above embodiment.

Firstly, the object to be observed is set on the mount 12 of the microscope 10, and thereafter, a desirable enlarging magnification is selected by the enlarging magnification setting device 82 of the control table 40.

A magnification selection setting command signal is outputted to the magnification selection control circuit 28, the automatic focus adjusting unit 36, the light quantity adjusting device 38 and the X-Y driving device 72 by the enlarging magnification setting device 82.

The rotating direction specifying circuit 28A of the magnification selection control circuit 28, comparing an inputted selection-setting command signal with the currently set magnification of the objective 18, which is inputted from the position detector 45, selects the rotating direction of the shortest distance to the objective 18 having the instructed magnification and outputs the same to the driving circuit 28E through the memory 28B.

On the other hand, the stop judging circuit 28D compares a selection-setting command signal inputted through the memory 28C from the enlarging magnification setting device 82 with a current position signal inputted from the position detector 45, and, when the both signals coincide with each other, i.e. the objective 18 having the desired magnification coincides with the optical axis of the observing optical system, outputs a stop signal to the driving circuit 28E.

Until the stop signal is outputted from the stop judging circuit 28D, the driving circuit 28E rotates the driving mechanism 26 in response to a command signal of the rotating direction, which is inputted through the rotating direction specifying circuit 28A and the memory 28B.

Here, the two position sensors 46A and 46D detect the members 48 and 50 to be detected as being the magnets in the state where the click mechanism 62 is fallen into the recess 64 as shown in FIG. 4, whereby the current position of the objective 18 can be detected by a logical product of the detected signals.

Furthermore, the revolver 16 is rotated by the driving mechanism 26 and two position sensors associated with the specified positions detect the members 48 and 50 to be detected at the positions a/2 before the specified positions. The shift of a/2 in this case is made to coincide with a value of shift produced at the stop position due to the influence such as inertia.

Furthermore, the stop position is confirmed by a signal from one of the position sensors 46A–46D after the stop of the driving mechanism 26, and, when only one position sensor detects the member 48 or 50 to be detected, the direction, in which an error occurs, is judged from the relationship between the two possition sensors associated with the specified positions, so that correction can be made.

The members 48 and 50 to be detected as being the two magnets are utilized, so that the width of the object to be detected can be easily adjusted.

A selection setting command signal of the objective 18 from the enlarging magnification setting device 82 is inputted to the central processing unit 36E in the automatic focus adjusting unit 36 through the interface 36C.

The central processing unit 36E selects the pulse number n of a preset value drive associated with the given magnification on the basis of the information previously stored in the memory 36D.

Furthermore, an image signal obtained from the focus detector 32 is inputted to the video signal evaluating section 36B through the interface 36A, and the video signal evaluating section 36B outputs a signal associated with the distance to the position of focus of the mount 12 to the central processing unit 36E.

The central processing unit 36E outputs a driving signal to the driving section 36F in response to the aforesaid signal.

More specifically, until the object to be observed enters one of focal depth approaching areas (Refer to FIG. 8) set at the outsides of the focal depth associated with the magnification of the selected objective 18, a signal for high speed drive is outputted by the control circuit 37C from the high speed drive 34 at high speed through the driving section 36F.

The signal outputted from the driving section 36F causes the oscillator 44A of the excitation change-over device 44 in the driving mechanism 34A to output pulse signals for high speed drive, i.e. the signals of 22000P/sec shown in FIG. 8.

When the signal from the video signal evaluating section 36B becomes the signal of the mount 12 reaching the focal depth approaching area, the control circuit 37C switches the signal outputted to the driving section 36F from the high speed drive command device 37A to the preset value drive command device 37B.

As shown in FIG. 8, this preset value drive command device 37B outputs a command signal to the oscillator 44A to output a unit number of pulses n associated with the magnification of the selected objective 18.

In consequence, in association with the output from the preset value drive command device 37B, the stepping motor 42, when the selected magnification is 5 times for example, intermittently outputs pulses of the unit number of pulses n=50 pulses as shown in FIG. 8.

As for the unit number of pulses n, the value of feed of the mount 12, which is associated with this number of pulses, is set at 9.5 μm which is smaller than the focal length (When the magnification is 5 times, it is 28 μm), so that the object to be observed will not go over to the opposite side of the focal depth by one unit number of pulses n.

The central processing unit 36E catches a signal from the video signal evaluating section 36B through the preset value drive command device 37B per oscillation of the unit number of pulses n, and judges whether the mount 12 has entered the range of the focal length or not, whereby the unit 36E repeats the aforesaid process until the mount 12 enters the range of the focal length to drive the stepping motor 42.

Here, the automatic focus adjusting device 36 immediately drives the mount 12 from the current position thereof towards the position of focus of the objective 18, upon selecting and setting of the objective 18 by the enlarging magnification setting device 82. However, for example, such an arrangement may be adopted that the mount 12 is driven to the upper or the lower limit, whereby one of the limit switches 34B is turned on, and the mount 12 is driven to the predetermined position of focus in response to the on-signal of this limit switch 34B.

Here, the excitation change-over device 44 of the stepping motor 42 is of such an arrangement that the position of the stabilized point of the stepping motor 42 is gradually moved by a very small angle to gradually change the magnitudes of the currents of the respective phases of the plurality of excitation phases for finely dividing the step angle associated thereto per input pulse, so that the driving mechanism 34A directly connected to the stepping motor 42 can drive the mount 12 accurately by a very small value.

The selection-setting command signal for the objective 18, which is outputted from the enlarging magnification setting device 82, is inputted to the memory 38B of the light quantity adjusting device 38 through the decoder 38A.

In this memory 38A, a light quantity associated with the magnification of the selected objective 18 is previously stored, and th same is outputted to the light source turn-on control device 38C, which adjusts the light quantities of the lamps 14A and 14B in response to instructed light quantity signals.

Furthermore, an output signal from the central processing unit 36E in the automatic focus adjusting unit 36 is inputted to the light quantity setting device 84 through the interface 36C, and, for example, the light quantity setting device 84 outputs an adjusting signal of decrease or increase to the memory 38B when the signal from the video signal evaluating section 36B instructs an excessively high light quantity or an excessively low light quantity.

In consequence, the light quantity setting device 84 is operated by a signal from the automatic focus adjusting unit 36 or by the adjustment of an operator so as to change the record in the memory 38B.

In consequence, in the above embodiment, when selection and setting of the magnification are instructed by the enlarging magnification setting device 82 provided on the control table 40, an objective 18 is selected and set in response to the command signal, the mount 12 automatically sets the object to be observed to the position of focus of the objective 18, and further, the light quantities of the light source 14 are automatically set in association with the set enlarging magnification.

Moreover, the objective 18 is selected and set such that the revolver 16 is rotatably driven from the position, where the objective having the magnification has been set before the objective is newly selected, to the position of the selected objective for the shortest period of time, whereby the time period for selecting the objective 18 is shortened, so that the object to be observed can be accurately moved to the position of focus at high speed without causing hunting to the mount 12.

In consequence, for the system as a whole, the microscope 10 as a whole can be set efficiently, accurately and for a short period of time.

Here, the X-Y driving device 72 provided on the control box 10B drives the mount 12 in directions of X-axis and Y-axis to move the same to a predetermined position in response to a command signal from an automatic observation setting device 86 provided on the control table 40.

More specifically, the central processing unit 74 of the X-Y driving device 72, comparing the position signal of the mount 12 in the directions of X-axis and Y-axis, which is fed back from the position detector 70 with a given command signal in response to the command signal, drives the X-direction motor 66 and the Y-direction motor 68, both of which are stepping motors, through the X-Y direction driving circuit 78 and the Y-direction driving circuit 80.

The memory 76 in the X-Y driving device 72 stores the magnification selection-setting command signals from the enlarging magnification setting device 82 and outputs the contents thereof to the central processing unit 74.

Additionally, in the above embodiment, the magnification of the objective 18 is selected and set by the enlarging magnification setting device 82 provided on the control table 40. This arrangement may be replaced, for example, by one, wherein the automatic observation setting device 86 is provided on the control table 40, so that operation of the automatic observation setting device 86 makes it possible to fully automatically select and set the position of the mount 12 in the X-Y directions and the enlarging magnification of the objective 18.

In other words, the automatic observation setting device 86 performs not only setting of the position of the mount 12 but also selecting and setting of the enlarging magnification, so that the microscope 10 can be set fully automatically.

Furthermore, in the above embodiment, the position sensors 46A-46D of the magnification seleting device 30 are formed of the Hall IC and the members 48 and 50 to be detected are formed of the magnets, respectively, however, the present invention need not necessarily be limited to this, and, when necessary, such an arrangement may be adopted that the position of the objective 18 on the revolver 16 can be detected.

Additionally, such an arrangement may be adopted that the magnification selection control circuit 28 selects the shortest rotating direction of the objective 18, which is selected by the selection-setting command signal in response to the detection signal from the position detector 45 including the position sensors 46A-46D and the members 48 and 50 to be detected, so that the driving mechanism 26 can be driven.

Furthermore, the automatic focus adjusting unit 36 has the video signal evaluating section 36B, whereby the signal from the focus detector 32 is evaluated, so that the focus can be detected from the sharpness of the image. However, the present invention need not necessarily be limited to this, and, such an arrangement may be adopted that the automatic focus adjusting unit 36 can detect whether the mount 12 is positioned within the range of the focal length and the focal depth approaching area of the selected objective 18 or not.

What is claimed is:

1. A microscope comprising:
   a mount for mounting an object to be observed;
   a light source for illuminating said object to be observed;
   an enlarging optical system including a plurality of objectives provided on a revolver, and receiving at least one of reflected light and transmitted light from said object to be observed to enlargingly form an image of said object to be observed; and
   an observing optical system including an ocular lens and observing said image formed by said enlarging optical system; wherein said microscope further comprises:
   a magnification selecting unit including a driving mechanism for rotating said revolver, and a magnification selection control circuit for automatically positioning said selected objective to the optical axis of said enlarging optical system;
   an automatic focus adjusting unit including a focus detector opposed to said observing optical system, for discriminating th enlargedly formed image of said object to be observed, and a mount moving device for driving said mount to the position of focus of said selected objective along the optical axis of said objective by means of a driving mechanism in response to an output signal from said focus detector;
   a light quantity adjusting unit for adjusting the quantity of emitted light from said light source on the basis of a preset light quantity value; and
   a control table for automatically actuating said magnification selecting unit, said automatic focus adjusting unit and said light quantity adjusting unit in accordance with predetermined steps in response to a magnification selection signal.

2. A microscope as set forth in claim 1, wherein said mount moving device includes:
   a stepping motor directly connected to said mount; and
   an excitation change-over device for gradually changing magnitudes of currents of respective phases of a plurality of excitation phases for finely dividing a step angle by gradually moving a position of said stepping motor by an incremental angle per input pulse.

3. A microscope as set forth in claim 2, wherein said stepping motor has a four phase basic construction of 1-2 phase excitation, and, in said excitation change-over device, an exciting current is gradually changed over so that the first phase and the second phase are shifted from each other in phase by 90°.

4. A microscope as set forth in claim 2, wherein said mount moving device further comprises;
   a high speed drive command capable of outputting pulse signals for high speed feed to said stepping motor to feed a driving shaft at high speed;
   a preset value drive command device for outputting a predetermined number of pulse signals fewer than said pulse signals for the high speed feed, as a unit, to said stepping motor on the basis of the focal depth of a set objective;
   a control circuit for switchingly connecting said stepping motor from said high speed drive command device to the preset value drive command device when it is detected that said mount approaches the range of the focal depth of said set objective from a detection output signal of said focus detector, for collating the value of the approach with an output signal of said focus detector per unit pulse drive, and for repeatedly actuating said preset value drive command device until said mount enters the range of the focal depth of the set objective.

5. A microscope as set forth in claim 3, wherein said mount moving device further comprises;
   a high speed drive command device capable of outputting pulse signals for high speed feed to said stepping motor to feed a driving shaft at high speed;
   a preset value drive command device for outputting a predetermined number of pulse signals fewer than said pulse signals for the high speed feed, as a unit, to said stepping motor on the basis of the focal depth of a set objective;
   a control circuit for switchingly connecting said stepping motor from said high speed drive command device to the preset value drive command device when it is detected that said mount approaches the range of the focal depth of said set objective from a detection output signal of said focus detector, for collating the value of the approach with an output signal of said focus detector per unit pulse drive, and for repeatedly actuating said preset value drive command device until said mount enters the range of the focal depth of the set objective.

6. A microscope as set forth in claim 1, wherein said magnification selecting unit includes:
   a plurality of position sensors secured onto the stationary side of said revolver, corresponding in number to the plurality of objectives provided on said revolver;
   two members to be detected secured onto the rotatable side of said revolver and capable of being simultaneously detected by two of the plurality of position sensors; and
   a rotating direction specifying circuit for identifying the current objective in response to an output signal from said position sensors and specifying the shortest rotating direction to said objective having the instructed magnification.

7. A microscope as set forth in claim 2, wherein said magnification selecting unit includes:
   a plurality of position sensors secured onto the stationary side of said revolver, corresponding in number to the plurality of objectives provided on said revolver;
   two members to be detected secured onto the rotatable side of said revolver and capable of being simultaneously detected by two of the plurality of position sensors; and
   a rotating direction specifying circuit for identifying the current objective in response to an output signal from said position sensors and specifying the shortest rotating direction to said objective having the instructed magnification.

8. A microscope as set forth in claim 3, wherein said magnification selecting unit includes:
- a plurality of position sensors secured onto the stationary side of said revolver, corresponding in number to the plurality of objectives provided on said revolver;
- two members to be detected secured onto the rotatable side of said revolver and capable of being simultaneously detected by two of the plurality of position sensors; and
- a rotating direction specifying circuit for identifying the current objective in response to an output signal from said position sensors and specifying the shortest rotating direction to said objective having the instructed magnification.

9. A microscope as set forth in claim 4, wherein said magnification selecting unit includes:
- a plurality of position sensors secured onto the stationary side of said revolver, corresponding in number to the plurality of objectives provided on said revolver;
- two members to be detected secured onto the rotatable side of said revolver and capable of being simultaneously detected by two of the plurality of position sensors; and
- a rotating direction specifying circuit for identifying the current objective in response to an output signal from said position sensors and specifying the shortest rotating direction to said objective having the instructed magnification.

10. A microscope as set forth in claim 5, wherein said magnification selecting unit includes:
- a plurality of position sensors secured onto the stationary side of said revolver, corresponding in number to the plurality of objectives provided on said revolver;
- two members to be detected secured onto the rotatable side of said revolver and capable of being simultaneously detected by two of the plurality of position sensors; and
- a rotating direction specifying circuit for identifying the current objective in response to an output signal from said position sensors and specifying the shortest rotating direction to said objective having the instructed magnification.

11. A microscope as set forth in claim 1, wherein said control table includes an automatic observation setting device making it possible to fully automatically select and set the position of said mount in the X-Y directions and the enlarging magnification of said objective.

12. A microscope as set forth in claim 2, wherein said control table includes an automatic observation setting device making it possible to fully automatically select and set the position of said mount in the X-Y directions and the enlarging magnification of said objective.

13. A microscope as set forth in claim 3, wherein said control table includes an automatic observation setting device making it possible to fully automatically select and set the position of said mount in the X-Y directions and the enlarging magnification of said objective.

14. A microscope as set forth in claim 4, wherein said control table includes an automatic observation setting device making it possible to fully automatically select and set the position of said mount in the X-Y directions and the enlarging magnification of said objective.

15. A microscope as set forth in claim 5, wherein said control table includes an automatic observation setting device making it possible to fully automatically select and set the position of said mount in the X-Y directions and the enlarging magnification of said objective.

16. A microscope as set forth in claim 6, wherein said control table includes an automatic observation setting device making it possible to fully automatically select and set the position of said mount in the X-Y directions and the enlarging magnification of said objective.

17. A microscope as set forth in claim 7, wherein said control table includes an automatic observation setting device making it possible to fully automatically select and set the position of said mount in the X-Y directions and the enlarging magnification of said objective.

18. A microscope as set forth in claim 8, wherein said control table includes an automatic observation setting device making it possible to fully automatically select and set the position of said mount in the X-Y directions and the enlarging magnification of said objective.

19. A microscope as set forth in claim 9, wherein said control table includes an automatic observation setting device making it possible to fully automatically select and set the position of said mount in the X-Y directions and the enlarging magnification of said objective.

20. A microscope as set forth in claim 10, wherein said control table includes an automatic observation setting device making it possible to fully automatically select and set the position of said mount in the X-Y directions and the enlarging magnification of said objective.

21. A mount moving device for a microscope including
- a plurality of objectives which can be selectively set to an observing optical system of said microscope;
- a moving mechanism for moving a mount along the axis of said objective set on said observing optical system; and
- a focus detector for detecting the pass-fail of the focus of said set objective from said observing optical system wherein said mount moving device further includes:
- a stepping motor directly connected to a driving shaft of said moving mechanism and formed to become a stabilized point per predetermined step angle;
- an excitation change-over device for gradually changing magnifications of currents of respective phases of a plurality of excitation phases for finely dividing the step angle associated thereto by gradually moving a position of said stepping motor by an incremental angle per input pulse;
- a high speed drive command device capable of outputting pulse signals for high speed feed to said stepping motor to feed said driving shaft at high speed;
- a preset value drive command device for outputting a predetermined number of pulse signals fewer than said pulse signals for the high speed feed, as a unit, to said stepping motor on the basis of the focal depth of said set objective; and
- a control circuit for switchingly connecting said stepping motor from said high speed drive command device to the preset value drive command device when it is detected that said mount approaches the range of the focal depth of said set objective from a detection output signal of said focus detector, for collating the value of the approach with an output signal of said focus detector per unit pulse drive, and for repeatedly actuating said preset value drive command device until said mount enters the range of the focal depth of the set objective.

* * * * *